Jan. 31, 1956   R. DE PUIFFE DE MAGONDEAU   2,732,951
ACCORDION PLEATED FILTER AND METHOD FOR MAKING
Filed Sept. 4, 1952
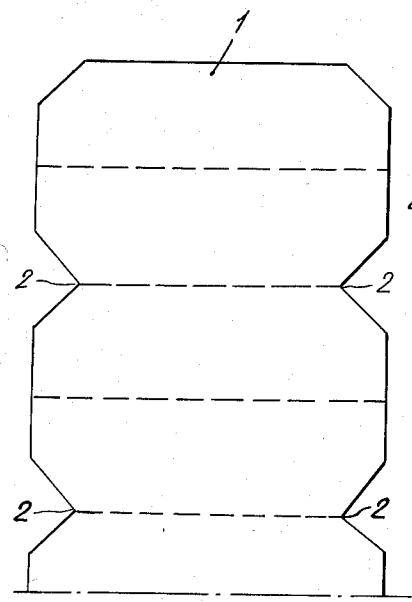
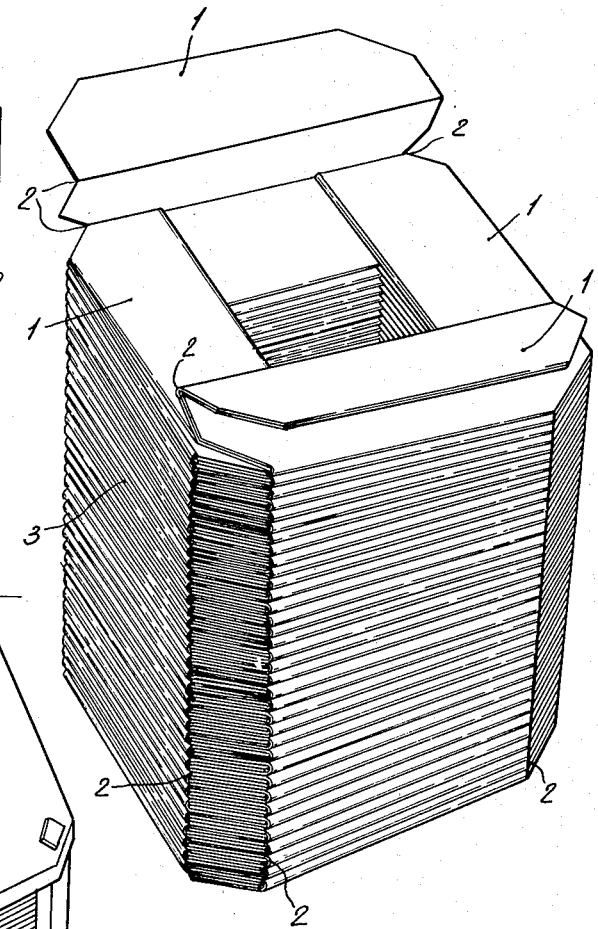
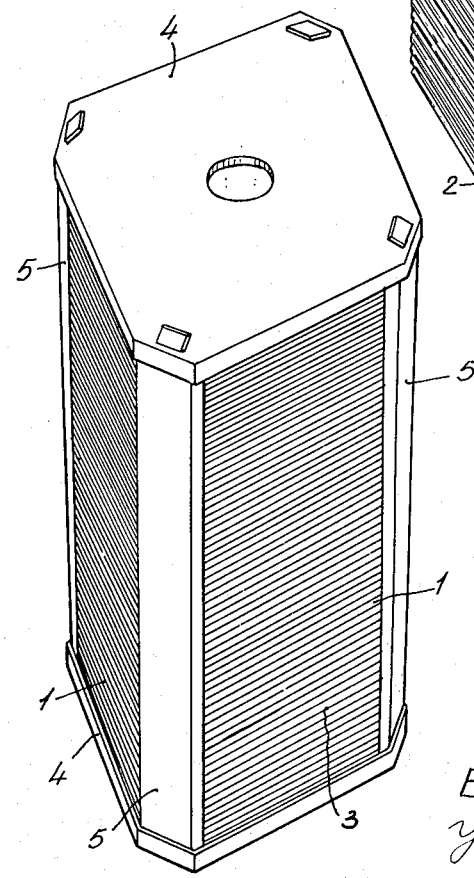
Inventor
Roger de Puiffe
de Magondeau
By
Young, Linden & Thompson
Attys.

United States Patent Office 2,732,951
Patented Jan. 31, 1956

2,732,951
ACCORDION PLEATED FILTER AND METHOD FOR MAKING

Roger de Puiffe de Magondeau, Paris, France

Application September 4, 1952, Serial No. 307,831

Claims priority, application France October 12, 1951

13 Claims. (Cl. 210—169)

My invention has for its object improvements in filters with a view to executing same readily and economically for any desired application, said filters being of a high efficiency while taking up very little room for a comparatively large filtering surface.

My invention is characterized by the fact that I resort to filter paper which I cut into strips that I then notch along their edges and fold accordionwise. This being done, I assemble a plurality of strips with their folds all lying in parallel planes to form a polygonal hollow arrangement in which the corresponding folds of the adjacent strips engage each other, the filtering area being constituted by the intervals between the folds of each strip. The strips are secured in their assembled position through any suitable conventional means.

In addition to the above disclosed main feature of my invention, further and advantageous features will appear in the reading of the following description, given hereinafter, of a preferred embodiment of said invention, reference being made to accompanying diagrammatic drawings, wherein:

Fig. 1 illustrates a strip of filter paper prepared for the execution of a filter according to my invention;

Fig. 2 is a perspective view of a filter in the making;

Fig. 3 is an elevational view, on a slightly smaller scale, of the finished filter.

As shown in Fig. 1, I start from a sheet 1 of filter paper in which I provide, in symmetrical regular distribution along both longitudinal edges, notches 2 assuming a triangular shape. I then fold the strip accordionwise, as shown by the interrupted lines, i. e. from notch to notch and half-way between successive notches.

When executing a parallelepipedic filter, I start with four strips 1 of the type illustrated in Fig. 1, so as to form with said strips the four side walls of the filter, the folded strips being placed pairwise in front of each other, as illustrated in Fig. 2, the folds in the adjacent strips engaging each other to form a series of superposed intervals 3 surrounding the inner channel defined by the four standing filter strips and through which the fluid to be filtered is caused to pass.

For holding fast the assembled system of strips, I resort to a plate 4 fitted betwen the four lowermost folds of the upright system of four strips, said fluidtightness in this section of the filter is obtained by unfolding said lowermost folds of the four strips 1, after which the plate 4 forming the cover of the filter, is laid between said folds with its upstanding flanges against the outside of the strips; I furthermore resort to flat cover plates 5 covering the outer corners of the filter constituted by the ends of the outer folds formed by the notched parts of the strips; said cover plates serve for holding covers 4 in position.

Obviously, at least one of the covers 4 is provided with a port for the exhaust of the filtered fluid, the fluid being presumed to flow from the outside towards the inside of the filter unit.

The preceding disclosure allows readily ascertaining how simple the execution of said filter is, while a very large filtering surface is obtained with a very small volume of the filter occupying consequently a very small bulk, the ratio between the volume and the filtering surface being constant.

According to the nature of the fluid to be filtered and to the amount of fluid to be filtered per unit of time, the strips 1 are laid in simple or superposed layers.

My invention is not limited to the embodiment more particularly disclosed hereinabove and it covers all the modifications thereof falling within the scope of accompanying claims and in particular the cover or covers may be fitted outside the paper assembly as illustrated or else as disclosed inside the outermost folds of the adjacent strip sections of the assembly.

My invention also covers, by way of novel articles of manufacture, the filtering units and filters incorporating same, obtained according to the method disclosed hereinabove.

What I claim is:

1. A method for executing filters consisting in notching, uniformly and symmetrically, along their longitudinal edges, a plurality of rectangular strips of filter paper, folding said strips accordionwise, the folds extending between the opposed corresponding notches of the respective edges and midway between said notches, and assembling the folded strips in polygonal formation round an inner prismatic recess, the notched parts of the different strips being directed outwardly of the strip assembly and the corresponding folds of any two adjacent strips engaging each other and extending orthogonally with reference to the axis of the recess, to form thereby filtering passages between the superposed series of registering folds in the different strips.

2. A method for executing filters consisting in notching, uniformly and symmetrically, along their longitudinal edges, a plurality of rectangular strips of filter paper, folding said strips accordionwise, the folds extending between the opposed corresponding notches of the respective edges and midway between said notches, and assembling the folded strips in square formation round an inner parallelepipedic recess, the notched parts of the different strips being directed outwardly of the strip assembly and the corresponding folds of any two adjacent strips engaging each other and extending orthogonally with reference to the axis of the recess, to form thereby filtering passages between the superposed series of registering folds in the different strips.

3. A method for executing filters consisting in notching, uniformly and symmetrically, along their longitudinal edges, a plurality of rectangular strips of filter paper, folding said strips accordionwise, the folds extending between the opposed corresponding notches of the respective edges and midway between said notches, and assembling the folded strips in polygonal formation round an inner prismatic recess, the notched parts of the different strips being directed outwardly of the strip assembly and the corresponding folds of any two adjacent strips engaging each other and extending orthogonally with reference to the axis of the recess, to form thereby filtering passages between the superposed series of registering folds in the different strips and fitting a flanged cover over at least one end of the strip assembly.

4. A method for executing filters consisting in notching, uniformly and symmetrically, along their longitudinal edges, a plurality of rectangular strips of filter paper, folding said strips accordionwise, the folds extending between the opposed corresponding notches of the respective edges and midway between said notches, assembling the folded strips in polygonal formation round an inner prismatic recess, the notched parts of the different strips being directed outwardly of the strip assembly and the corresponding folds of any two adjacent strips engaging each other and extending orthogonally with reference to the axis of the recess to form thereby filtering passages between the superposed series of registering folds in the different strips, and fitting a flanged cover over at least one end of the strip assembly and cover plates over the corners of the polygonal strip assembly in register with the superposed notched parts of the corresponding adjacent strips.

5. A filter unit comprising a polygonal assembly surrounding an inner prismatic recess and including strips of filtering paper lying in adjacent standing relationship round said recess, folded perpendicularly to the axis of the inner recess and provided along their edges with similar series of uniformly distributed notches registering with one fold out of two, the corresponding folds of the adjacent strips engaging each other and the notched parts of the strips facing the outside of the polygonal assembly to form the corners thereof.

6. A filter unit comprising a polygonal assembly surrounding an inner prismatic recess and including strips of filtering paper lying in adjacent standing relationship round said recess folded perpendicularly to the axis of the inner recess and provided along their edges with similar series of uniformly distributed notches registering with one fold out of two, the corresponding folds of the adjacent strips engaging each other and the notched parts of the polygonal assembly to form the corners thereof, and a flanged cover fitted over at least one extreme section of the polygonal filter assembly.

7. A filter unit comprising a polygonal assembly surrounding an inner prismatic recess and including strips of filtering paper lying in adjacent standing relationship round said recess, folded perpendicularly to the axis of the inner recess and provided along their edges with similar series of uniformly distributed notches registering with one fold out of two, the corresponding folds of the adjacent strips engaging each other and the notched parts of the polygonal assembly to form the corners thereof, a flanged cover fitted over each extreme section of the polygonal filter assembly, and cover plates extending between the extreme plate covers over the corners of the polygonal assembly.

8. A method for making filters comprising folding a plurality of strips of filter paper accordionwise, and assembling the folded strips in polygonal formation about an inner recess, the corresponding folds of any two adjacent strips engaging each other and extending about the recess to form thereby filtering passages between the super-posed series of registering folds in the different strips.

9. A method for making filters comprising folding a plurality of strips of filter paper accordionwise, assembling the folded strips in polygonal formation about an inner recess, the corresponding folds of any two adjacent strips engaging each other and extending about the recess to form thereby filtering passages between the superposed series of registering folds in the different strips, and fitting a rigid frame about said filter to maintain said folds in contact.

10. A method for making filters comprising folding a plurality of strips of filter paper accordionwise, and inserting the edges of the folded portions fold by fold between the edge portions of the folds of an adjacent strip.

11. In a filter for fluids, a prismatic block comprising a rigid frame and a plurality of accordion pleated strips of filter paper mounted in said frame and constituting the side walls of the prismatic block, each pleated strip having fold lines transversely arranged and two longitudinal edge portions inserted fold by fold between the edge portions of the adjacent strips, and said portions being maintained in contact by pressure of the rigid frame.

12. In a filter for fluids, a plurality of accordion pleated strips of filter paper forming walls about an inner opening, each pleated strip having fold lines transversely arranged and two longitudinal edge portions inserted fold by fold between the edge portions of the adjacent strips.

13. A filter comprising a plurality of accordion pleated strips of filter paper, each pleated strip having fold lines transversely arranged and a longitudinal edge portion inserted fold by fold between the edge portions of the folds of an adjacent strip.

References Cited in the file of this patent

UNITED STATES PATENTS

| | | |
|---|---|---|
| 2,556,521 | Chase | June 12, 1951 |
| 2,587,693 | Burks et al. | Mar. 4, 1952 |

FOREIGN PATENTS

| | | |
|---|---|---|
| 452,547 | Great Britain | Aug. 25, 1936 |